(12) United States Patent  
Shirota

(10) Patent No.: US 8,130,452 B2  
(45) Date of Patent: Mar. 6, 2012

(54) ELECTRONIC IMAGE PICKUP APPARATUS

(75) Inventor: Eiji Shirota, Hino (JP)

(73) Assignee: Olympus Imaging Corp., Tokyo (JP)

(*) Notice: Subject to any disclaimer, the term of this patent is extended or adjusted under 35 U.S.C. 154(b) by 0 days.

(21) Appl. No.: 12/804,744

(22) Filed: Jul. 27, 2010

(65) Prior Publication Data

US 2010/0295974 A1    Nov. 25, 2010

Related U.S. Application Data

(62) Division of application No. 11/901,195, filed on Sep. 13, 2007, now Pat. No. 7,791,817.

(30) Foreign Application Priority Data

Oct. 13, 2006 (JP) ................................. 2006-279866

(51) Int. Cl.  
*G02B 15/14* (2006.01)

(52) U.S. Cl. ....................................... 359/680; 359/676

(58) Field of Classification Search .................. 359/676, 359/684, 686, 680–682  
See application file for complete search history.

(56) References Cited

U.S. PATENT DOCUMENTS

| 2004/0027685 A1 | 2/2004 | Mihara et al. |
| 2004/0066561 A1 | 4/2004 | Nagata et al. |
| 2005/0007678 A1 | 1/2005 | Sueyoshi |
| 2006/0268426 A1* | 11/2006 | Arimoto et al. ............... 359/686 |
| 2006/0280498 A1 | 12/2006 | Souma et al. |

FOREIGN PATENT DOCUMENTS

| EP | 1 630 584 | 3/2006 |
| JP | 2004-354869 | 12/2004 |
| JP | 2004-354871 | 12/2004 |
| JP | 2005-338344 | 12/2005 |

* cited by examiner

*Primary Examiner* — James Greece  
(74) *Attorney, Agent, or Firm* — Kenyon & Kenyon LLP

(57) ABSTRACT

An electronic image pickup apparatus comprising a zoom lens system and an image pickup device disposed on an image side of the zoom lens system and which converts an image formed by the zoom lens system into an electric signal, the zoom lens system having, in order from an object side, a negative first lens unit, a positive second lens unit, a negative third lens unit, and a positive fourth lens unit, the first lens unit having, in order from the object side, a negative lens and a reflective optical element which reflects an optical path, and during zooming from a wide-angle end to a telephoto end, each space between the lens units which are adjacent with each other being changed, the first lens unit being arranged in a fixed position to the image pickup device, and at least the second lens unit and the third lens unit being moved.

18 Claims, 10 Drawing Sheets

ELECTRONIC IMAGE PICKUP APPARATUS

CROSS REFERENCE TO RELATED APPLICATIONS

This application is a divisional of U.S. patent application Ser. No. 11/901,195 filed on Sep. 13, 2007, now U.S. Pat. No. 7,791,817 which claims priority to Japanese Application No. 2006-279866 filed on Oct. 13, 2006, which is expressly incorporated herein in its entirety by reference thereto.

BACKGROUND OF THE INVENTION

1. Field of the Invention

The present invention relates to an electronic image pickup apparatus, more particularly, to an electronic image pickup apparatus including a zoom lens system having a reflective element.

2. Description of the Related Art

In recent years, instead of a 35 mm silver halide film camera (135 formats), a digital camera (an electronic camera) has been a mainstream which photographs a subject by use of an electronic image pickup device such as a CCD image sensor or a CMOS type image sensor. Furthermore, the camera has a large number of categories in a broad range from a highly functional type for business to a portable popular type.

Especially, in the category of the portable popular type, it has been demanded that a conveniently usable electronic image pickup apparatus (a video camera, a digital camera or the like) including a zoom lens system and having a small size in a depth direction be provided.

The largest problem (bottleneck) which hampers thinning of the camera in the depth direction is a thickness of an optical system, especially the zoom lens system from a surface closest to an object side to an image pickup surface. In recent years, as a mainstream of a camera body thinning technology, a so-called collapsible lens barrel is employed in which the optical system projects from a camera body during photographing, but the system is stored when carried.

However, in a case where the collapsible lens barrel is employed, much time is required for starting the apparatus so as to bring stored lenses into a usable state, which is unfavorable for usability. When a lens unit closest to the object side is movable, many disadvantages are generated from a viewpoint of waterproof or dust-proof design.

In one of constitutions which have been developed in recent years, an optical path (an optical axis) of the optical system is bent by a reflective optical element such as a mirror or a prism so as to provide a camera remarkably thin in the depth direction. The constitution is favorable since, unlike the collapsible lens barrel, a startup time to bring the camera into the usable state (a time to extend the lenses) is not required and water-proof or dust-proof design may be easily introduced.

In the constitution, the lens unit closest to the object side is fixed in a direction along the optical axis, the lens unit is provided with the reflective optical element, the optical path reflected by the optical element extends in a vertical or horizontal direction of the camera body, and a dimension of the electronic image pickup apparatus in the depth direction is set to be as small as possible.

A zoom lens system in which the optical system capable of achieving the thinning of the apparatus and which is of a positive-lead lens type (the lens unit closest to the object side has a positive refractive power) is disclosed in, for example, Japanese Patent Application Laid-Open Nos. 2004-354,871 and 2004-354,869.

However, such a lens type is constituted so that a composite system of a first lens unit and a second lens unit has a negative refractive power in a wide-angle end, but the total length of the whole system easily increases. The zoom lens system of the positive-lead lens type is largely influenced by a manufacturing error.

On the other hand, in a zoom lens system of a negative-lead lens type (the lens unit closest to the object side has a negative refractive power), one lens unit closest to the object side in the wide-angle end has a negative refractive power, and the total length of the system is advantageously reduced. It is also known that the system is scarcely influenced by the manufacturing error.

As such a zoom lens system of the negative-lead lens type, a zoom lens system is disclosed in Japanese Patent Application Laid-Open No. 2005-338,344. This zoom lens system has, in order from the object side, a fixed negative lens unit, a positive lens unit which is movable for zooming, a fixed negative lens unit, and a fourth lens unit which moves along a track which is convex toward an image surface in order to compensate an image position.

BRIEF SUMMARY OF THE INVENTION

The present invention is directed to an electronic image pickup apparatus comprising a zoom lens system and an image pickup device which is disposed on an image side of the zoom lens system and which converts an image formed by the zoom lens system into an electric signal.

Moreover, the zoom lens system includes, in order from an object side, a first lens unit having a negative refractive power, a second lens unit having a positive refractive power, a third lens unit having a negative refractive power and a fourth lens unit having a positive refractive power.

The first lens unit includes, in order from the object side, a negative lens and a reflective optical element which reflects an optical path.

During zooming from a wide-angle end to a telephoto end, each space between the lens units which are adjacent with each other is changed, but the first lens unit is arranged in a fixed position to the image pickup device.

According to a first aspect of the present invention, during the zooming from the wide-angle end to the telephoto end, at least the second lens unit and the third lens unit are moved.

According to a second aspect of the present invention, the fourth lens unit includes a single lens having a positive refractive power, and the total number of the lenses of the fourth lens unit is one.

According to a third aspect of the present invention, the zoom lens system is constituted as a four-unit zoom lens system, the second lens unit includes, in order from the object side, a plurality of positive lenses and a negative lens, and the negative lens is cemented to the positive lens disposed on the object side of the negative lens.

Other features and advantages of the present invention will become apparent from the following detailed description of the embodiments when taken in conjunction with the accompanying drawings and appended claims.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 1A is a sectional view of the system in a wide-angle end, FIG. 1B is a sectional view of the system in an intermediate position, and FIG. 1C is a sectional view of the system in a telephoto end;

FIG. 2A is a sectional view of the system in a wide-angle end, FIG. 2B is a sectional view of the system in an intermediate position, and FIG. 2C is a sectional view of the system in a telephoto end;

FIG. 3A is a sectional view of the system in a wide-angle end, FIG. 3B is a sectional view of the system in an intermediate position, and FIG. 3C is a sectional view of the system in a telephoto end;

FIG. 4A shows a state of the wide-angle end, FIG. 4B shows a state of the intermediate position, and FIG. 4C shows a state of the telephoto end;

FIG. 5A shows a state of the wide-angle end, FIG. 5B shows a state of the intermediate position, and FIG. 5C shows a state of the telephoto end;

FIG. 6A shows a state of the wide-angle end, FIG. 6B shows a state of the intermediate position, and FIG. 6C shows a state of the telephoto end;

DETAILED DESCRIPTION OF THE PREFERRED EMBODIMENTS

Figure 1A:
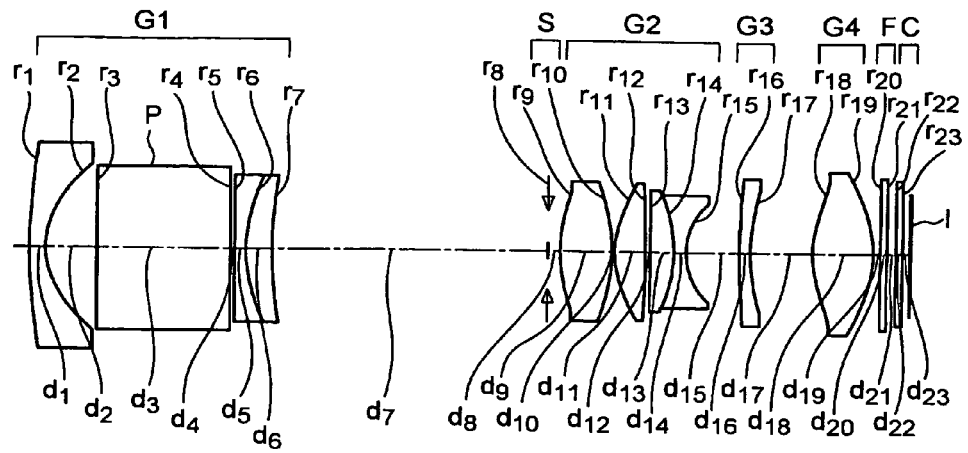
FIGS. 1A to 1C are sectional views of Example 1 of a zoom lens system for use in an electronic image pickup apparatus of the present invention, including an optical axis when focused at infinity.

First, a zoom lens system for use in an electronic image pickup apparatus according to the present invention will be described.

This zoom lens system includes, in order from an object side, a first lens unit having a negative refractive power, a second lens unit having a positive refractive power, a third lens unit having a negative refractive power and a fourth lens unit having a positive refractive power. Moreover, the first lens unit includes, in order from the object side, a negative lens and a reflective optical element which reflects an optical path.

During zooming from a wide-angle end to a telephoto end, each space between the lens units which are adjacent with each other is changed, but the first lens unit is arranged in a fixed position to an image pickup device.

When the first lens unit is provided with the negative refractive power, a diameter of the first lens unit can be reduced. When the first lens unit includes the reflective optical element, an effective diameter of optical elements disposed behind the reflective optical element can be reduced. Moreover, a thickness of an electronic image pickup apparatus in a depth direction can be reduced.

Moreover, in a case where the second lens unit is a positive lens unit and the third lens unit is a negative lens unit, these second and third lens units constitute an optical system of a telephoto type in which the positive refractive power and the negative refractive power are arranged. According to this constitution, a front-side principal point of a composite optical system of the second lens unit and the third lens unit can be positioned close to the first lens unit. Therefore, since a space between the principal points of the first lens unit and the composite optical system of the second and third lens units can be reduced, the total length of the zoom lens system can be reduced.

Moreover, in an arrangement in which the fourth lens unit is a positive lens unit, a ray which enters the image pickup device can come close to a state vertical to an image pickup surface, telecentricity can be secured, and deterioration of an image can easily be suppressed.

In the above-mentioned lens constitution, it is preferable that the second and third lens units are moved during the zooming to perform the zooming and compensate a change of an image surface position due to the zooming.

In such a lens unit movement system, the fourth lens unit can be simply fixed or slightly moved to perform the zooming. Therefore, a space between the fourth lens unit and an image surface can be reduced, and this is advantageous in reducing the total length of the zoom lens system.

Moreover, it is preferable that the zoom lens system has an aperture stop which moves integrally with the second lens unit. In consequence, a diameter of each lens in the second lens unit and lenses disposed after the second lens unit can be reduced, and this is further advantageous for miniaturization.

It is preferable that the fourth lens unit is constituted of a single lens having a positive refractive power, and is provided with a function of a field lens. This field lens contributes to securement of the telecentricity. This function is satisfactorily fulfilled by only the single lens having the positive refractive power, and such a one-lens constitution is also preferable for achieving the miniaturization.

It is more preferable that the fourth lens unit includes one positive lens component having an aspherical surface. This constitution is advantageous for correction of an astigmatism, regulation of an exit pupil position and the miniaturization.

It is preferable that the second lens unit includes, in order from the object side, a plurality of positive lenses and a negative lens, and the negative lens is cemented to the positive lens disposed on the object side of the negative lens.

When the second lens unit has the above-mentioned constitution, the positive refractive power of the second lens unit can be shared by the plurality of positive lenses. When the negative lens is disposed, aberrations can easily be cancelled by the negative lens and the positive lenses. Since this negative lens is cemented to the object-side positive lens, a chromatic aberration is easily corrected, and an influence of relative eccentricity between the lenses having strong powers is easily suppressed.

The second lens unit is a lens unit having a zooming function, but according to the above-mentioned constitution, even if the refractive power of the second lens unit is increased, the aberrations are easily corrected, and the total length of the zoom lens system is advantageously reduced.

Moreover, when the lenses are arranged in the above-mentioned order, a divergent light flux from the first lens unit is gradually converged by a plurality of positive lens. Afterward, the negative lens is arranged, and a front-side principal point of the second lens unit can therefore be positioned close to the object side. In consequence, a zoom ratio is advantageously secured with respect to a movement amount, and the system is further advantageously miniaturized. A coma and a curvature of field are advantageously corrected.

Especially, it is preferable that the second lens unit has at least a positive lens and a cemented lens constituted by cementing a positive lens and a negative lens in order from the object side.

It is preferable that the reflective optical element disposed in the first lens unit includes a prism having a reflective surface.

When the reflective optical element is constituted as a prism, an optical path length can be reduced, an entrance pupil can therefore be set to be shallow, a lens diameter can be reduced, and a length of the prism can be reduced.

It is preferable that the above-mentioned zoom lens system satisfies the following condition:

$$0.4 < f_2/f_1 < 0.8 \quad (1),$$

in which $f_2$ is a focal length of the second lens unit, and $f_1$ is a focal length of the zoom lens system in the telephoto end.

The condition (1) appropriately defines the refractive power of the second lens unit.

In a case where $f_2/f_1$ is not above an upper limit of the condition (1) so that the positive refractive power of the second lens unit is secured, the movement amount of the second lens unit can be suppressed, and the system is further advantageously miniaturized.

In a case where $f_2/f_1$ is not below a lower limit of the condition (1) so that the positive refractive power of the second lens unit is appropriately suppressed, the generation of the aberration can be suppressed, and especially the curvature of field can advantageously be corrected.

Moreover, it is preferable that the zoom lens system satisfies the following condition:

$$1.5 < |f_1/f_w| < 3.0 \quad (2),$$

in which $f_1$ is a focal length of the first lens unit, and $f_w$ is a focal length of the zoom lens system in the wide-angle end.

The condition (2) appropriately defines the refractive power of the first lens unit.

When $|f_1/f_w|$ is not above an upper limit of the condition (2), the entrance pupil can be inhibited from being deepened (a distance from an incidence surface to the entrance pupil can be inhibited from being increased), and a diameter of the negative lens of the first lens unit is easily prevented from being increased. A size of the reflective surface of the reflective optical element is easily reduced.

When $|f_1/f_w|$ is not below a lower limit of the condition (2), a distortion and the curvature of field are easily inhibited from being excessively increased.

Moreover, it is preferable that the zoom lens system satisfies the following condition:

$$1.0 < |f_{L1}/f_w| < 2.0 \quad (3),$$

in which $f_{L1}$ is a focal length of the negative lens of the first lens unit closest to the object side, and $f_w$ is a focal length of the zoom lens system in the wide-angle end.

The condition (3) appropriately defines the refractive power of the negative lens of the first lens unit. To set the entrance pupil to be shallow (reduce the distance between the incidence surface and the entrance pupil) so that the optical path can be reflected, the refractive power of the negative lens of the first lens unit may be increased.

When $|f_{L1}/f_w|$ is not above an upper limit of the condition (3), the refractive power of the negative lens is secured, and the entrance pupil is easily set to be shallow. Therefore, even if an angle of view is secured, diameters and sizes of optical elements (the lenses and the reflective optical element) constituting the first lens unit are easily inhibited from being increased, and the reflective optical element is easily arranged.

When the second lens unit following the first lens unit is moved, a zoom ratio is easily obtained. While the movement amount of the second lens unit is reduced, the zoom ratio is easily secured.

In a case where $|f_{L1}/f_w|$ is not below a lower limit of the condition (3), an off-axial aberration such as the distortion easily generated in the negative lens in which an incident ray height easily increases and a chromatic aberration are advantageously corrected.

Moreover, in the above-mentioned zoom lens system, in a case where the third lens unit is moved during the zooming from the wide-angle end to the telephoto end, it is preferable that the third lens unit moves toward the object side and then reverses a movement direction thereof to move toward the image surface.

When the third lens unit is moved as described above, the total length of the zoom lens system is advantageously reduced. Moreover, the third lens unit can be provided with a function of compensating a position of the image surface. Furthermore, the curvature of field is advantageously corrected.

Moreover, it is more preferable to move the third lens unit so that the unit is arranged closer to the object side in the telephoto end than in the wide-angle end. In consequence, the third lens unit is also easily provided with a zooming function, and a balance between the miniaturization and the securing of the zoom ratio is easily established.

Furthermore, it is more preferable that during the zooming from the wide-angle end to the telephoto end, the second lens unit moves toward the only object side, the third lens unit moves toward the object side, and then moves toward the image surface, the fourth lens unit is arranged in a fixed position to the image pickup device, and the second lens unit moves via a state in which the unit has a magnification of −1.

According to the above-mentioned movement system of the lens unit, the second lens unit is easily provided with a main zooming function while suppressing the total length of the zoom lens system. Moreover, the third lens unit can be provided with a function of compensating a fluctuation of an image position due to the zooming. The third lens unit moves along a track so as to be positioned closest to the object side in the vicinity of the state in which the second lens unit has the magnification of −1.

To provide the fourth lens unit with a function of compensating a fluctuation of the image position, the fourth lens unit needs to be moved along a track which is convex toward the image side. Therefore, it is difficult to reduce the space between the fourth lens unit and the image pickup device.

When the third lens unit is moved as described above, a space where the lens units are to be arranged is advantageously reduced.

It is preferable that the third lens unit is constituted of one single lens having a negative refractive power.

When the third lens unit includes the minimum number of the lenses so as to have the function of compensating the fluctuation of the image position, the zoom lens system is easily miniaturized.

It is preferable that the aperture stop of the zoom lens system is arranged immediately before the second lens unit on the object side and moved integrally with the second lens unit. In this case, it is more preferable that the second lens unit includes, in order from the object side, two positive lenses whose convex surfaces face the object side, a positive lens and a negative lens whose concave surface faces the image side.

The aperture stop is integrated with the second lens unit to reduce an effective diameter of the second lens unit in which the refractive power easily increases, and both of the miniaturization and the securement of the refractive power are advantageously realized.

At this time, when the second lens unit is constituted as described above, the light flux from the first lens unit is gradually converged by the plurality of positive lenses, and an off-axial light flux is refracted in such a direction as to come away from the optical axis by the negative lens closest to the image side, so that a size of the second lens unit can be set to be small with respect to that of the image surface.

Moreover, a principal point of the second lens unit itself can be disposed close to the first lens unit, and the zoom ratio is advantageously secured with respect to the movement amount of the second lens unit.

It is more preferable that the third lens unit has a negative lens component whose concave surface faces the image side so as to satisfy the following condition:

$$1.0 < (R_1 + R_2)/(R_1 - R_2) < 3.0 \quad (4),$$

in which $R_1$ is a paraxial radius of curvature of an object-side surface of the negative lens component, and $R_2$ is a paraxial radius of curvature of an image-side surface of the negative lens component. Here, the lens component is a lens having only two surfaces of the object-side surface and the image-side surface which come in contact with air in the optical path, and is a single lens or a cemented lens.

The condition (4) appropriately defines a shape of the negative lens component included in the third lens unit.

When $(R_1+R_2)/(R_1-R_2)$ is not above an upper limit of the condition (4), the third lens unit is easily arranged close to the object side with respect to the principal point, and the diameter is advantageously reduced. Moreover, generation of the aberration at the center of the image surface is easily suppressed.

When $(R_1+R_2)/(R_1-R_2)$ is not below a lower limit of the condition (4), the paraxial radius of curvature of the negative lens component is inhibited from being excessively reduced; and the curvature of field is easily corrected.

Furthermore, it is more preferable that the third lens unit includes the only negative lens component, the image-side surface of the second lens unit is a concave surface, and the object-side surface of the fourth lens unit is a convex surface.

According to such a constitution, curvatures of lens surfaces of the second and third lens units which face each other, and curvatures of lens surfaces of the third and fourth lens units which face each other have the same signs, respectively, the fourth lens unit itself can further be thinned, and the system is advantageously miniaturized. In addition, the aberration fluctuation during the zooming is easily suppressed. Also in this respect, it is preferable to satisfy the above condition (4).

Moreover, it is preferable that the first lens unit has one positive lens and one negative lens on the image side of the reflective optical element. In consequence, the chromatic aberration and the like of the first lens unit are advantageously corrected, and a size of the first lens unit is advantageously reduced.

Moreover, it is more preferable to set the above-mentioned conditions as follows. In consequence, the above-mentioned effects can further be produced.

It is more preferable to set an upper limit value of the condition (1) to 0.7, and it is more preferable to set a lower limit value to 0.5.

It is more preferable to set an upper limit value of the condition (2) to 2.5, and it is more preferable to set a lower limit value to 1.8.

It is more preferable to set an upper limit value of the condition (3) to 1.9, and it is more preferable to set a lower limit value to 1.5.

It is more preferable to set an upper limit value of the condition (4) to 2.5, and it is more preferable to set a lower limit value to 1.5.

Moreover, it is preferable that the above-mentioned zoom lens system is constituted as a four-unit zoom lens system, that is, as a zoom lens system which does not have any lens unit after the fourth lens unit, so that the total length of the system is reduced.

Next, numerical examples of the zoom lens system will be described.

Figure 1B:
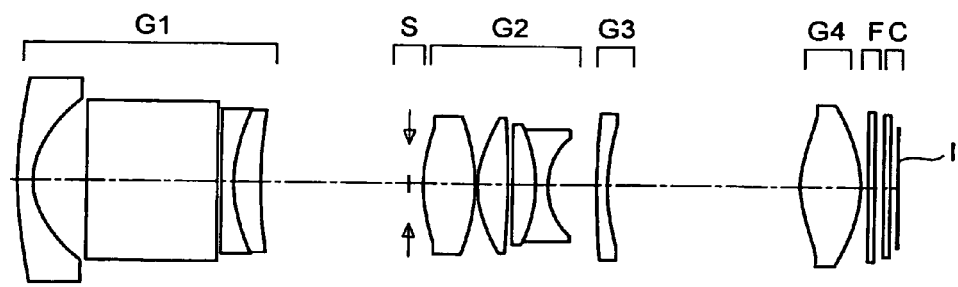
Figure 1C:
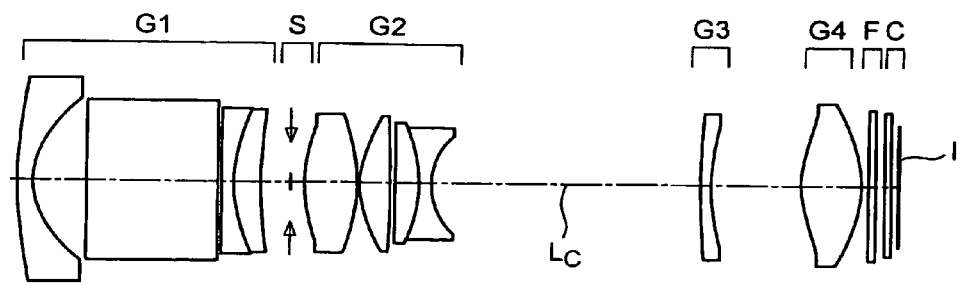
Figure 2A:
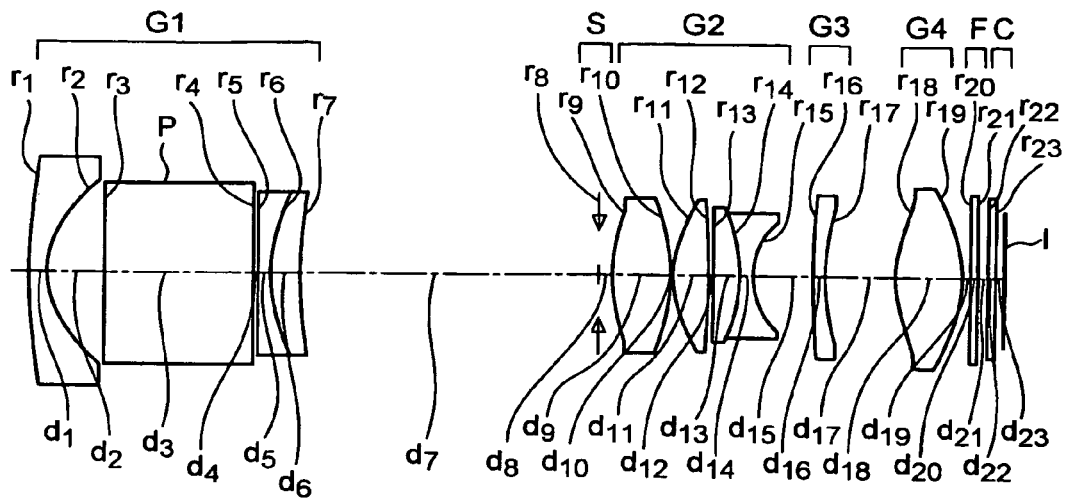
FIGS. 2A to 2C are sectional views of Example 2 of the zoom lens system for use in the electronic image pickup apparatus of the present invention, including the optical axis when focused at infinity.
Figure 2B:
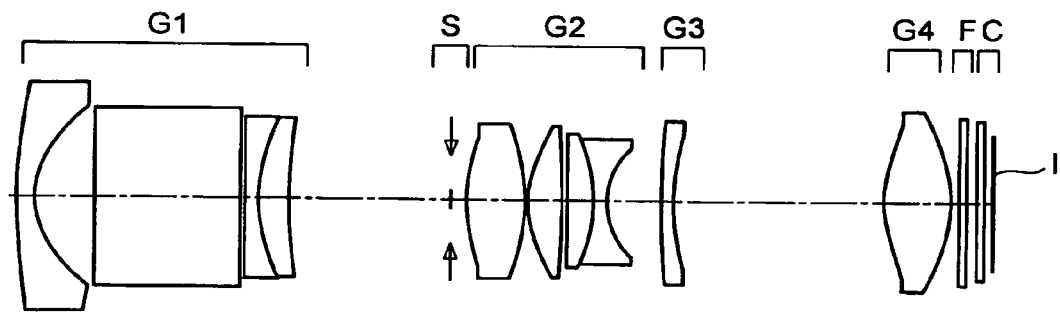
Figure 2C:
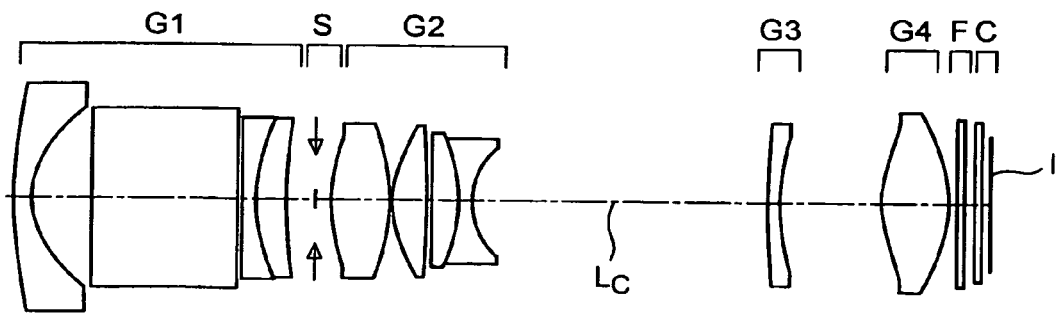
Figure 3A:
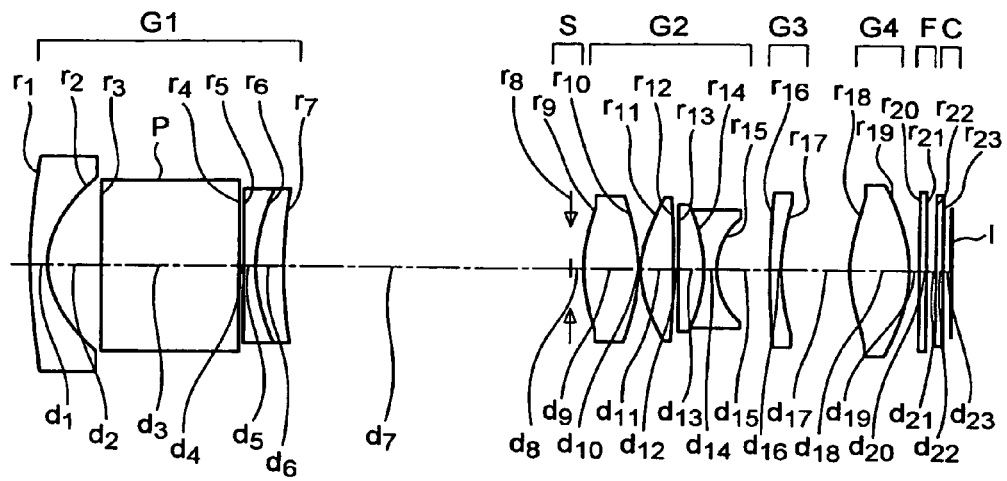
FIGS. 3A to 3C are sectional views of Example 3 of the zoom lens system for use in the electronic image pickup apparatus of the present invention, including the optical axis when focused at infinity.
Figure 3B:
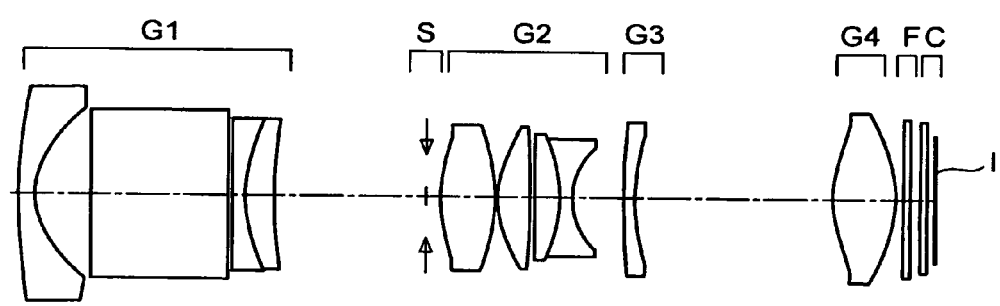
Figure 3C:
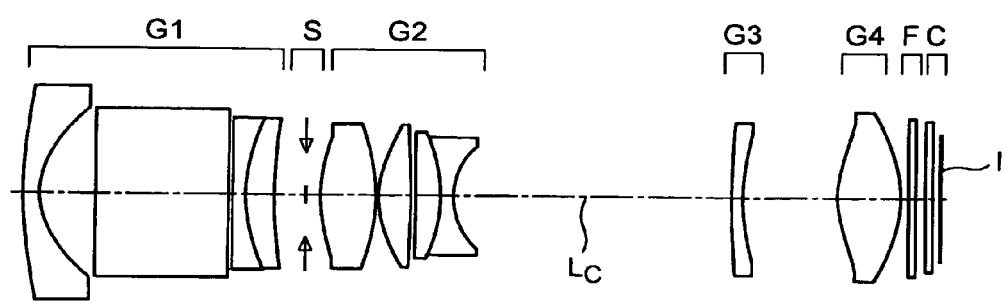
Figure 11:
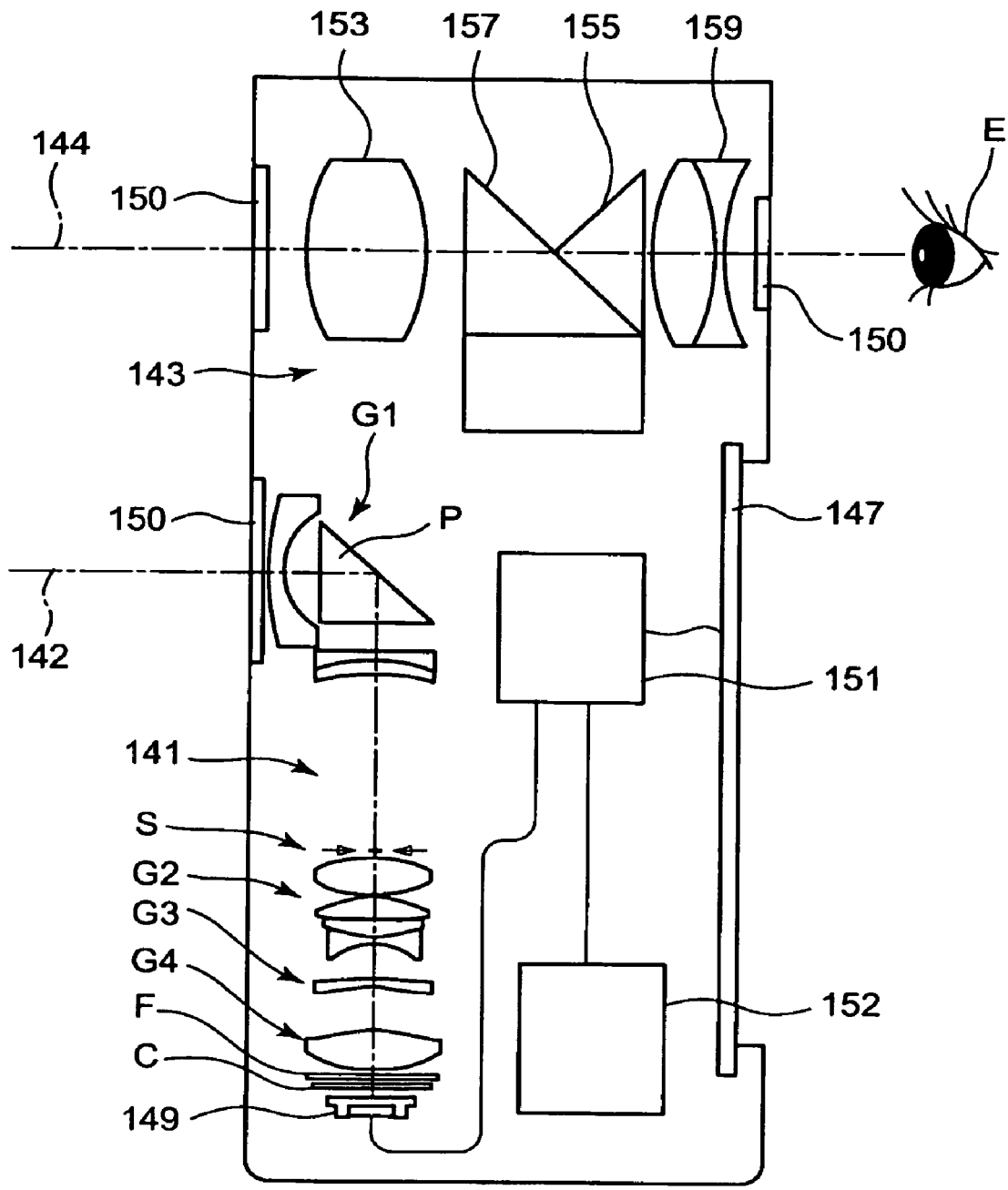
FIG. 11 is a schematic diagram showing an inner constitution of the digital camera of FIG. 9.

FIGS. 1A to 3C are sectional views of Numerical Examples 1 to 3 including an optical axis when focused at infinity. FIGS. 1A, 2A and 3A are sectional views in a wide-angle end, FIGS. 1B, 2B and 3B are sectional views in an intermediate position, and FIGS. 1C, 2C and 3C are sectional views in a telephoto end. In FIGS. 1A to 3C, G1 is a first lens unit, G2 is a second lens unit, S is an aperture stop, G3 is a third lens unit, G4 is a fourth lens unit, a parallel flat plate F is a low pass filter provided with a wavelength band restrictive coating which limits an infrared ray, a parallel flat plate C is a cover glass of an electronic image pickup device, and I is an image surface. It is to be noted that the surface of the cover glass C may be provided with a multilayered thin film for limiting a wavelength band. The cover glass C may be provided with a function of the low pass filter. The parallel flat plate P of the first lens unit G1 is development of an optical path bending prism. A reflective surface is positioned in the middle of a third surface and a fourth surface described later in lens data. It is to be noted that as the optical path bending prism P, a reflective prism which bends the optical path as much as 90° as shown in FIG. 11 is used in many cases, but another reflective prism may be used.

A zoom lens system shown in FIGS. 1A to 1C includes, in order from an object side, a first lens unit G1 having a negative refractive power, an aperture stop S, a second lens unit G2 having a positive refractive power, a third lens unit G3 having a negative refractive power and a fourth lens unit G4 having a positive refractive power.

During zooming from a wide-angle end to a telephoto end, the first lens unit G1 is fixed, the second lens unit G2 moves toward the object side, the third lens unit G3 once moves toward the object side and then reverses a movement direction thereof to move toward an image side, and the fourth lens unit G4 is fixed.

The first lens unit G1 includes, in order from the object side, a first negative meniscus lens whose concave surface faces the image side, an optical path bending prism P, a second double-concave negative lens, and a third positive meniscus lens whose convex surface faces the object side. The second double-concave negative lens is cemented to the third positive meniscus lens. The second lens unit G2 includes, in order from the object side, a fourth double-convex positive lens, a fifth double-convex positive lens, a sixth positive meniscus lens whose concave surface faces the object side, and a seventh double-concave negative lens. The sixth positive meniscus lens is cemented to the seventh double-concave negative lens. The third lens unit G3 includes an eighth negative meniscus lens whose convex surface faces the object side. The fourth lens unit G4 includes a ninth double-convex positive lens.

Aspherical surfaces are used on five surfaces including an image-side surface of the first negative meniscus lens, opposite surfaces of the fourth double-convex positive lens, and opposite surfaces of the ninth double-convex positive lens.

A zoom lens system shown in FIGS. 2A to 2C includes, in order from an object side, a first lens unit G1 having a negative refractive power, an aperture stop S, a second lens unit G2 having a positive refractive power, a third lens unit G3 having a negative refractive power and a fourth lens unit G4 having a positive refractive power.

During zooming from a wide-angle end to a telephoto end, the first lens unit G1 is fixed, the second lens unit G2 moves toward the object side, the third lens unit G3 once moves toward the object side, and reverses a movement direction thereof to move toward an image side and the fourth lens unit G4 is fixed.

The first lens unit G1 includes, in order from the object side, a first negative meniscus lens whose concave surface faces the image side, an optical path bending prism P, a second double-concave negative lens and a third positive meniscus lens whose convex surface faces the object side. The second double-concave negative lens is cemented to the third positive meniscus lens. The second lens unit G2 includes, in order from the object side, a fourth double-convex positive lens, a fifth double-convex positive lens, a sixth positive meniscus lens whose concave surface faces the object side and a seventh double-concave negative lens. The sixth positive meniscus lens is cemented to the seventh double-concave negative lens. The third lens unit G3 includes an eighth negative meniscus lens whose convex surface faces the object side. The fourth lens unit G4 includes a ninth double-convex positive lens.

Aspherical surfaces are used on five surfaces including an image-side surface of the first negative meniscus lens, opposite surfaces of the fourth double-convex positive lens and opposite surfaces of the ninth double-convex positive lens.

A zoom lens system shown in FIGS. 3A to 3C includes, in order from an object side, a first lens unit G1 having a negative refractive power, an aperture stop S, a second lens unit G2 having a positive refractive power, a third lens unit G3 having a negative refractive power and a fourth lens unit G4 having a positive refractive power.

During zooming from a wide-angle end to a telephoto end, the first lens unit G1 is fixed, the second lens unit G2 moves toward the object side, the third lens unit G3 once moves toward the object side, and reverses a movement direction thereof to move toward an image side, and the fourth lens unit G4 is fixed.

The first lens unit G1 includes, in order from the object side, a first negative meniscus lens whose concave surface faces the image side, an optical path bending prism P, a second double-concave negative lens and a third positive meniscus lens whose convex surface faces the object side. The second double-concave negative lens is cemented to the third positive meniscus lens. The second lens unit G2 includes a fourth double-convex positive lens, a fifth double-convex positive lens, a sixth positive meniscus lens whose concave surface faces the object side and a seventh double-concave negative lens. The sixth positive meniscus lens is cemented to the seventh double-concave negative lens. The third lens unit G3 includes an eighth negative meniscus lens whose convex surface faces the object side. The fourth lens unit G4 includes a ninth double-convex positive lens.

Aspherical surfaces are used on five surfaces including an image-side surface of the first negative meniscus lens, opposite surfaces of the fourth double-convex positive lens and opposite surfaces of the ninth double-convex positive lens.

Next, numerical data of the above zoom lens systems will be described. In addition to the above symbols, f is a focal length of a zoom lens system, $F_{NO}$ is the F-number, $\omega$ is a half angle of view, WE is a wide-angle end, ST is an intermediate position, TE is a telephoto end, $r_1, r_2, \ldots$ are paraxial radii of curvatures of lens surfaces, $d_1, d_2, \ldots$ are spaces between the lens surfaces, $n_{d1}, n_{d2}, \ldots$ are refractive indices of lenses for the d-line, and $v_{d1}, v_{d2}, \ldots$ are the Abbe numbers of the lenses. Symbol (AS) after the radius of curvature indicates that the surface is an aspherical surface, (S) indicates that the surface is an aperture stop surface, and (I) indicates that the surface is an image surface, respectively. A shape of the aspherical surface is represented by the following equation in a coordinate system in which an optical axis is an x-axis (it is assumed that a light traveling direction is a positive direction), an intersection between the optical axis and the aspherical surface is an origin, and a direction passing through the origin and crossing the optical axis at right angles is a y-axis.

$$x=(y^2/r)/[1+\{1-(K+1)(y/r)^2\}^{1/2}]+A_4 y^4+A_6 y^6+A_8 y^8+A_{10}y^{10}+A_{12}y^{12},$$

in which r is a paraxial radius of curvature, K is a conic constant, and $A_4, A_6, A_8, A_{10}$ and $A_{12}$ are 4-th, 6-th, 8-th, 10-th and 12-th order aspherical coefficients. In the aspherical surface coefficient, "e-n" (n is an integer) indicates "$\times 10^{-n}$".

Numerical Example 1

| | | | |
|---|---|---|---|
| $r_1 = 37.208$ | $d_1 = 1.00$ | $n_{d1} = 1.85135$ | $v_{d1} = 40.10$ |
| $r_2 = 6.337$(AS) | $d_2 = 3.10$ | | |
| $r_3 = \infty$ | $d_3 = 7.80$ | $n_{d2} = 1.83481$ | $v_{d2} = 42.71$ |
| $r_4 = \infty$ | $d_4 = 0.20$ | | |
| $r_5 = -1172.817$ | $d_5 = 0.66$ | $n_{d3} = 1.49700$ | $v_{d3} = 81.54$ |
| $r_6 = 10.191$ | $d_6 = 1.69$ | $n_{d4} = 1.90366$ | $v_{d4} = 31.31$ |
| $r_7 = 29.145$ | $d_7 = $ variable | | |
| $r_8 = \infty$(S) | $d_8 = 0.75$ | | |
| $r_9 = 11.445$(AS) | $d_9 = 3.16$ | $n_{d5} = 1.59201$ | $v_{d5} = 67.02$ |
| $r_{10} = -14.097$(AS) | $d_{10} = 0.10$ | | |
| $r_{11} = 7.662$ | $d_{11} = 2.00$ | $n_{d6} = 1.72916$ | $v_{d6} = 54.68$ |
| $r_{12} = -47.575$ | $d_{12} = 0.10$ | | |
| $r_{13} = -291.192$ | $d_{13} = 1.51$ | $n_{d7} = 1.88300$ | $v_{d7} = 40.76$ |
| $r_{14} = -10.276$ | $d_{14} = 0.66$ | $n_{d8} = 1.90366$ | $v_{d8} = 31.31$ |
| $r_{15} = 4.480$ | $d_{15} = $ variable | | |
| $r_{16} = 36.574$ | $d_{16} = 0.70$ | $n_{d9} = 1.80400$ | $v_{d9} = 46.57$ |
| $r_{17} = 14.427$ | $d_{17} = $ variable | | |
| $r_{18} = 10.155$(AS) | $d_{18} = 3.55$ | $n_{d10} = 1.58913$ | $v_{d10} = 61.25$ |
| $r_{19} = -14.054$(AS) | $d_{19} = 0.50$ | | |
| $r_{20} = \infty$ | $d_{20} = 0.50$ | $n_{d11} = 1.54771$ | $v_{d11} = 62.84$ |
| $r_{21} = \infty$ | $d_{21} = 0.50$ | | |
| $r_{22} = \infty$ | $d_{22} = 0.50$ | $n_{d12} = 1.51633$ | $v_{d12} = 64.14$ |
| $r_{23} = \infty$ | $d_{23} = 0.37$ | | |
| $r_{24} = \infty$(I) | | | |

-continued

| Aspherical coefficient | | |
|---|---|---|
| 2nd surface | | |
| r = 6.337 | | |
| K = 0.000 | | |
| $A_4$ = −1.68882e−04 | $A_6$ = −4.89187e−06 | $A_8$ = −4.47919e−08 |
| $A_{10}$ = 2.02995e−09 | $A_{12}$ = −1.74477e−10 | |
| 9th surface | | |
| r = 11.445 | | |
| K = 0.000 | | |
| $A_4$ = −2.99481e−04 | $A_6$ = −1.32415e−05 | $A_8$ = 6.10010e−07 |
| $A_{10}$ = −3.03819e−08 | | |
| 10th surface | | |
| r = −14.097 | | |
| K = 0.000 | | |
| $A_4$ = 1.74109e−05 | $A_6$ = −6.71330e−06 | $A_8$ = 1.81593e−07 |
| $A_{10}$ = −1.56812e−08 | | |
| 18th surface | | |
| r = 10.155 | | |
| K = 0.000 | | |
| $A_4$ = −9.25614e−04 | $A_6$ = 7.45283e−05 | $A_8$ = −3.13454e−06 |
| $A_{10}$ = 2.89740e−08 | | |
| 19th surface | | |
| r = −14.054 | | |
| K = 0.000 | | |
| $A_4$ = −2.05197e−03 | $A_6$ = 2.92360e−04 | $A_8$ = −1.69661e−05 |
| $A_{10}$ = 4.22694e−07 | $A_{12}$ = −4.07295e−09 | |

| Zoom Data (∞) | WE | ST | TE |
|---|---|---|---|
| f(mm) | 5.07 | 9.58 | 17.37 |
| $F_{NO}$ | 3.30 | 4.50 | 5.09 |
| 2ω(°) | 80.83 | 44.00 | 24.46 |
| $d_7$ | 16.58 | 8.94 | 1.98 |
| $d_{15}$ | 3.27 | 2.93 | 16.25 |
| $d_{17}$ | 3.90 | 11.88 | 5.52 |

Numerical Example 2

| $r_1$ = 37.232 | $d_1$ = 1.00 | $n_{d1}$ = 1.85135 | $v_{d1}$ = 40.10 |
|---|---|---|---|
| $r_2$ = 6.345(AS) | $d_2$ = 3.08 | | |
| $r_3$ = ∞ | $d_3$ = 7.80 | $n_{d2}$ = 1.83481 | $v_{d2}$ = 42.71 |
| $r_4$ = ∞ | $d_4$ = 0.20 | | |
| $r_5$ = −1122.538 | $d_5$ = 0.66 | $n_{d3}$ = 1.49700 | $v_{d3}$ = 81.54 |
| $r_6$ = 10.192 | $d_6$ = 1.70 | $n_{d4}$ = 1.90366 | $v_{d4}$ = 31.31 |
| $r_7$ = 29.093 | $d_7$ = variable | | |
| $r_8$ = ∞(S) | $d_8$ = 0.75 | | |
| $r_9$ = 11.448(AS) | $d_9$ = 3.19 | $n_{d5}$ = 1.59201 | $v_{d5}$ = 67.02 |
| $r_{10}$ = −14.103(AS) | $d_{10}$ = 0.10 | | |
| $r_{11}$ = 7.659 | $d_{11}$ = 2.00 | $n_{d6}$ = 1.72916 | $v_{d6}$ = 54.68 |
| $r_{12}$ = −47.547 | $d_{12}$ = 0.10 | | |
| $r_{13}$ = −288.469 | $d_{13}$ = 1.51 | $n_{d7}$ = 1.88300 | $v_{d7}$ = 40.76 |
| $r_{14}$ = −10.239 | $d_{14}$ = 0.66 | $n_{d8}$ = 1.90366 | $v_{d8}$ = 31.31 |
| $r_{15}$ = 4.484 | $d_{15}$ = variable | | |
| $r_{16}$ = 36.590 | $d_{16}$ = 0.70 | $n_{d9}$ = 1.80400 | $v_{d9}$ = 46.57 |
| $r_{17}$ = 14.378 | $d_{17}$ = variable | | |
| $r_{18}$ = 10.143(AS) | $d_{18}$ = 3.55 | $n_{d10}$ = 1.58913 | $v_{d10}$ = 61.25 |
| $r_{19}$ = −13.943(AS) | $d_{19}$ = 0.50 | | |
| $r_{20}$ = ∞ | $d_{20}$ = 0.50 | $n_{d11}$ = 1.54771 | $v_{d11}$ = 62.84 |
| $r_{21}$ = ∞ | $d_{21}$ = 0.50 | | |
| $r_{22}$ = ∞ | $d_{22}$ = 0.50 | $n_{d12}$ = 1.51633 | $v_{d12}$ = 64.14 |
| $r_{23}$ = ∞ | $d_{23}$ = 0.37 | | |
| $r_{24}$ = ∞(I) | | | |

-continued

| Aspherical coefficient | | |
|---|---|---|
| 2nd surface | | |
| r = 6.345 | | |
| K = 0.000 | | |
| $A_4$ = −1.65289e−04 | $A_6$ = −4.88389e−06 | $A_8$ = −2.32910e−08 |
| $A_{10}$ = 8.96908e−10 | $A_{12}$ = −1.50387e−10 | |
| 9th surface | | |
| r = 11.448 | | |
| K = 0.000 | | |
| $A_4$ = −2.97053e−04 | $A_6$ = −1.26024e−05 | $A_8$ = 6.30126e−07 |
| $A_{10}$ = −3.04937e−08 | | |
| 10th surface | | |
| r = −14.103 | | |
| K = 0.000 | | |
| $A_4$ = 2.22265e−05 | $A_6$ = −6.38515e−06 | $A_8$ = 2.15120e−07 |
| $A_{10}$ = −1.62773e−08 | | |
| 18th surface | | |
| r = 10.143 | | |
| K = 0.000 | | |
| $A_4$ = −8.93052e−04 | $A_6$ = 7.24554e−05 | $A_8$ = −2.87069e−06 |
| $A_{10}$ = 2.33783e−08 | | |
| 19th surface | | |
| r = −13.943 | | |
| K = 0.000 | | |
| $A_4$ = −1.99543e−03 | $A_6$ = 2.91865e−04 | $A_8$ = −1.65663e−05 |
| $A_{10}$ = 3.97965e−07 | $A_{12}$ = −3.65767e−09 | |

| Zoom Data (∞) | WE | ST | TE |
|---|---|---|---|
| f(mm) | 5.07 | 9.58 | 17.39 |
| $F_{NO}$ | 3.30 | 4.50 | 5.10 |
| 2ω(°) | 80.95 | 44.02 | 24.44 |
| $d_7$ | 16.56 | 8.92 | 1.97 |
| $d_{15}$ | 3.25 | 2.93 | 16.23 |
| $d_{17}$ | 3.91 | 11.86 | 5.52 |

Numerical Example 3

| $r_1$ = 37.875 | $d_1$ = 1.00 | $n_{d1}$ = 1.85135 | $v_{d1}$ = 40.10 |
|---|---|---|---|
| $r_2$ = 6.325(AS) | $d_2$ = 3.10 | | |
| $r_3$ = ∞ | $d_3$ = 7.80 | $n_{d2}$ = 1.83481 | $v_{d2}$ = 42.71 |
| $r_4$ = ∞ | $d_4$ = 0.20 | | |
| $r_5$ = 1354.124 | $d_5$ = 0.66 | $n_{d3}$ = 1.49700 | $v_{d3}$ = 81.54 |
| $r_6$ = 10.228 | $d_6$ = 1.72 | $n_{d4}$ = 1.90366 | $v_{d4}$ = 31.31 |
| $r_7$ = 29.207 | $d_7$ = variable | | |
| $r_8$ = ∞(S) | $d_8$ = 0.75 | | |
| $r_9$ = 11.431(AS) | $d_9$ = 3.25 | $n_{d5}$ = 1.59201 | $v_{d5}$ = 67.02 |
| $r_{10}$ = −14.592(AS) | $d_{10}$ = 0.10 | | |
| $r_{11}$ = 7.477 | $d_{11}$ = 2.00 | $n_{d6}$ = 1.74100 | $v_{d6}$ = 52.64 |
| $r_{12}$ = −49.707 | $d_{12}$ = 0.10 | | |
| $r_{13}$ = −173.749 | $d_{13}$ = 1.51 | $n_{d7}$ = 1.88300 | $v_{d7}$ = 40.76 |
| $r_{14}$ = −9.286 | $d_{14}$ = 0.66 | $n_{d8}$ = 1.90366 | $v_{d8}$ = 31.31 |
| $r_{15}$ = 4.418 | $d_{15}$ = variable | | |
| $r_{16}$ = 49.887 | $d_{16}$ = 0.70 | $n_{d9}$ = 1.80400 | $v_{d9}$ = 46.57 |
| $r_{17}$ = 16.178 | $d_{17}$ = variable | | |
| $r_{18}$ = 10.157(AS) | $d_{18}$ = 3.57 | $n_{d10}$ = 1.58913 | $v_{d10}$ = 61.25 |
| $r_{19}$ = −12.911(AS) | $d_{19}$ = 0.50 | | |
| $r_{20}$ = ∞ | $d_{20}$ = 0.50 | $n_{d11}$ = 1.54771 | $v_{d11}$ = 62.84 |
| $r_{21}$ = ∞ | $d_{21}$ = 0.50 | | |
| $r_{22}$ = ∞ | $d_{22}$ = 0.50 | $n_{d12}$ = 1.51633 | $v_{d12}$ = 64.14 |
| $r_{23}$ = ∞ | $d_{23}$ = 0.37 | | |
| $r_{24}$ = ∞(I) | | | |

-continued

Aspherical coefficient

2nd surface r = 6.325
K = 0.000
$A_4$ = −1.80433e−04      $A_6$ = −6.62233e−07      $A_8$ = −4.72215e−07
$A_{10}$ = 1.86810e−08    $A_{12}$ = −3.99354e−10

9th surface r = 11.431
K = 0.000
$A_4$ = −2.48988e−04      $A_6$ = −9.02312e−06      $A_8$ = 4.37993e−07
$A_{10}$ = −2.13163e−08

10th surface r = −14.592
K = 0.000
$A_4$ = 5.94815e−05       $A_6$ = −5.56616e−06      $A_8$ = 2.19551e−07
$A_{10}$ = −1.34713e−08

18th surface r = 10.157
K = 0.000
$A_4$ = −1.11958e−03      $A_6$ = 8.51909e−05       $A_8$ = −2.98901e−06
$A_{10}$ = 2.01912e−08

19th surface r = −12.911
K = 0.000
$A_4$ = −2.72379e−03      $A_6$ = 3.73308e−04       $A_8$ = −2.00079e−05
$A_{10}$ = 4.70692e−07    $A_{12}$ = −4.35154e−09

| Zoom Data (∞) | WE | ST | TE |
|---|---|---|---|
| f(mm) | 5.07 | 9.55 | 17.38 |
| $F_{NO}$ | 3.30 | 4.50 | 5.10 |
| 2ω(°) | 80.73 | 44.05 | 24.42 |
| $d_7$ | 16.63 | 8.99 | 1.98 |
| $d_{15}$ | 3.24 | 2.93 | 16.30 |
| $d_{17}$ | 3.92 | 11.88 | 5.53 |

Figure 4A:
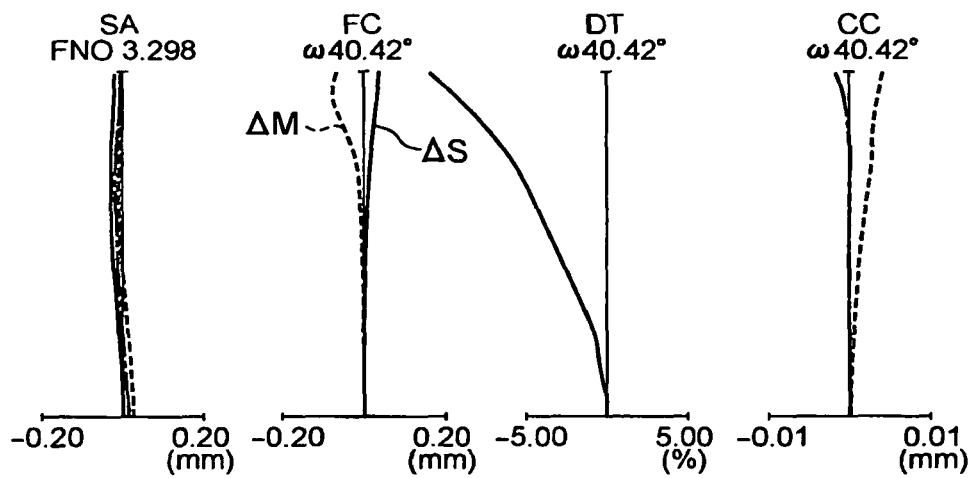
FIGS. 4A to 4C are aberration diagrams of Example 1 of the zoom lens system when focused at infinity, showing a spherical aberration (SA), an astigmatism (FC), a distortion (DT) and a chromatic aberration of magnification (CC)
Figure 4B:
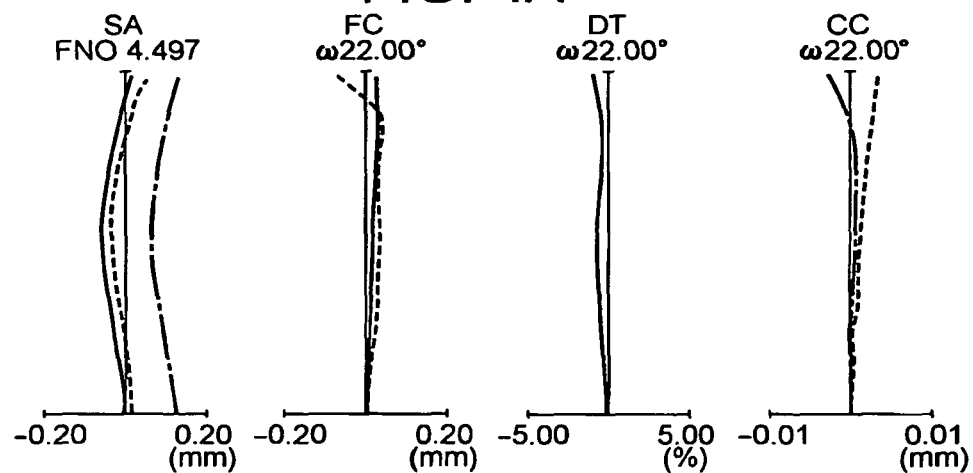
Figure 4C:
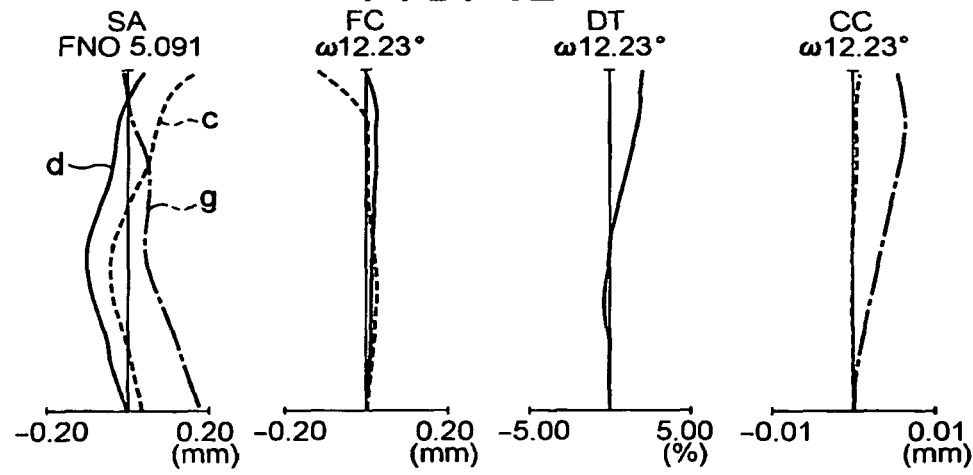
Figure 5A:
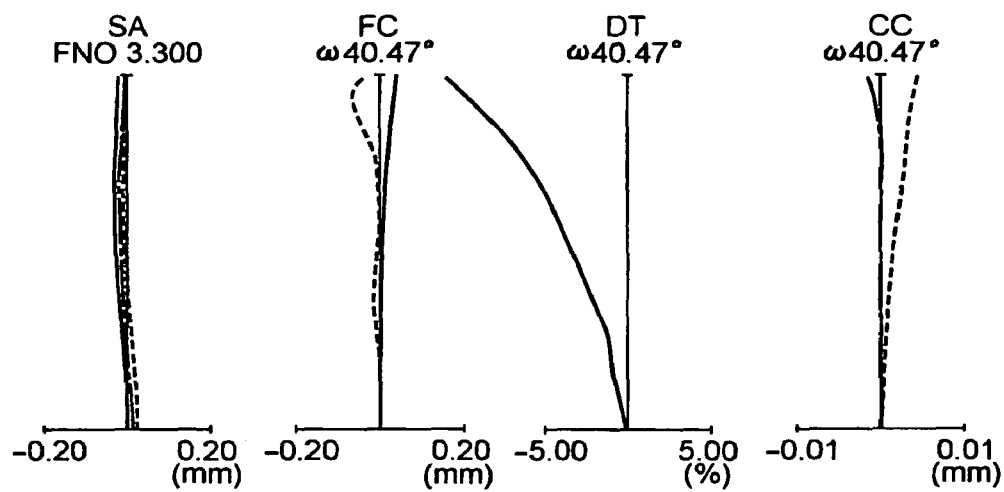
FIGS. 5A to 5C are aberration diagrams of Example 2 of the zoom lens system when focused at infinity, showing a spherical aberration (SA), an astigmatism (FC), a distortion (DT) and a chromatic aberration of magnification (CC)
Figure 5B:
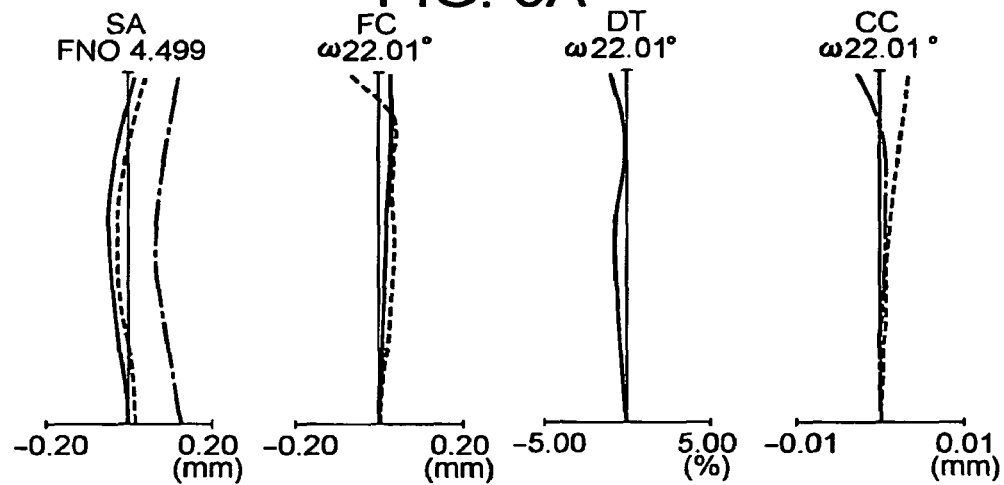
Figure 5C:
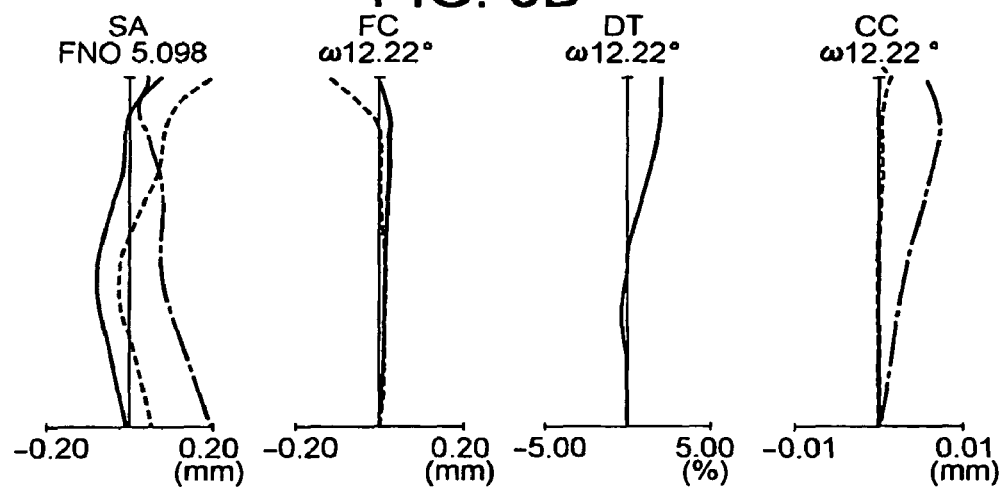
Figure 6A:
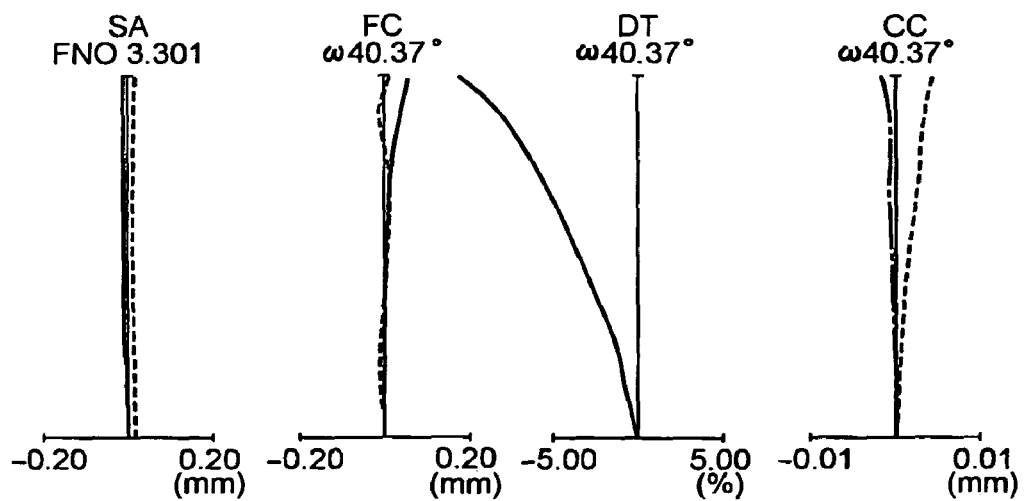
FIGS. 6A to 6C are aberration diagrams of Example 3 of the zoom lens system when focused at infinity, showing a spherical aberration (SA), an astigmatism (FC), a distortion (DT) and a chromatic aberration of magnification (CC)
Figure 6B:
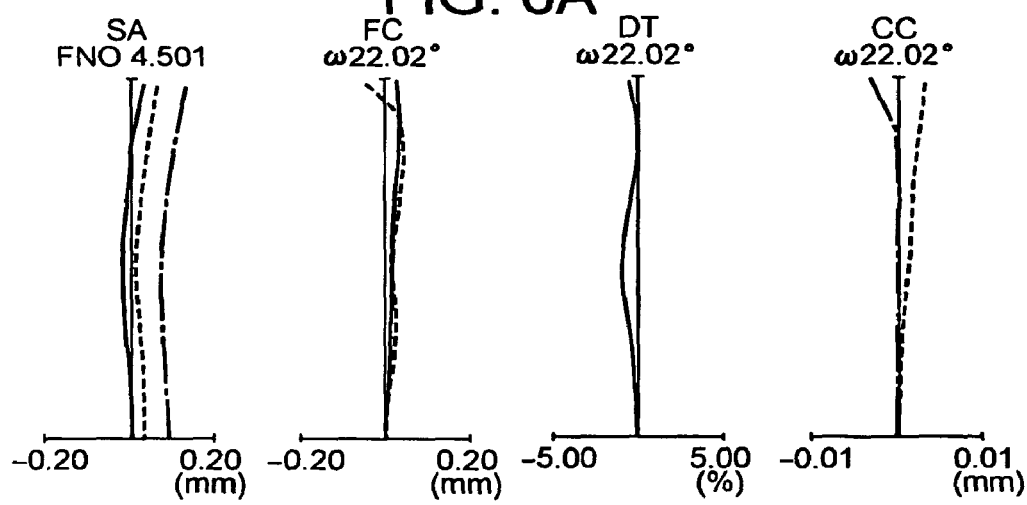
Figure 6C:
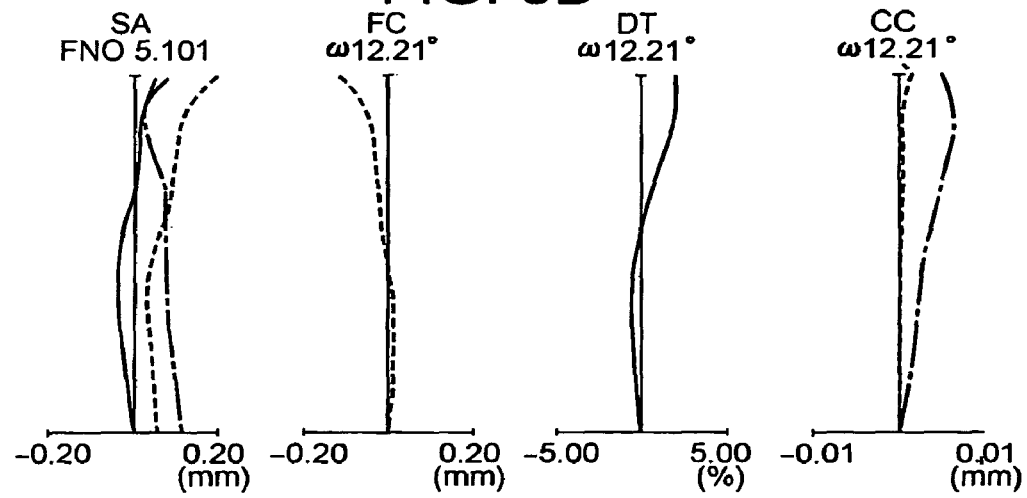

FIGS. 4A to 6C show aberration diagrams of Numerical Examples 1 to 3 when focused at infinity, respectively. In these aberration drawings, FIGS. 4A, 5A and 6A show a spherical aberration (SA), an astigmatism (FC), a distortion (DT) and a chromatic aberration (CC) of magnification in a wide-angle end, FIGS. 4B, 5B and 6B show the aberrations in an intermediate position, and FIGS. 4C, 5C and 6C show the aberrations in a telephoto end. In the drawings, ω is a half angle of view.

Next, values of the conditions (1) to (4) of the numerical examples will be described.

| Conditions | Numerical Example 1 | Numerical Example 2 | Numerical Example 3 |
|---|---|---|---|
| (1) $f_2/f_1$ | 0.65 | 0.65 | 0.65 |
| (2) $|f_1/f_w|$ | 2.08 | 2.08 | 2.09 |
| (3) $|f_{L1}/f_w|$ | 1.8 | 1.8 | 1.78 |
| (4) $(R_1 + R_2)/(R_1 − R_2)$ | 2.30 | 2.29 | 1.96 |

To miniaturize a zoom lens system and increase a zoom ratio, it is preferable to enlarge a negative refractive power of a first lens unit. However, in this case, a barrel-type distortion in the vicinity of the wide-angle end is easily generated. Therefore, in a case where an electronic image pickup apparatus is provided with a processing section which processes a signal from an image pickup device to correct the distortion of the zoom lens system, the electronic image pickup apparatus is further advantageously miniaturized and provided with a high performance.

Next, a basic concept will be described in a case where the distortion generated in an optical system is electrically corrected using an image processing technology in the electronic image pickup apparatus. In the following description, such a technique is referred to as digital correction of the distortion of an image.

Figure 7:
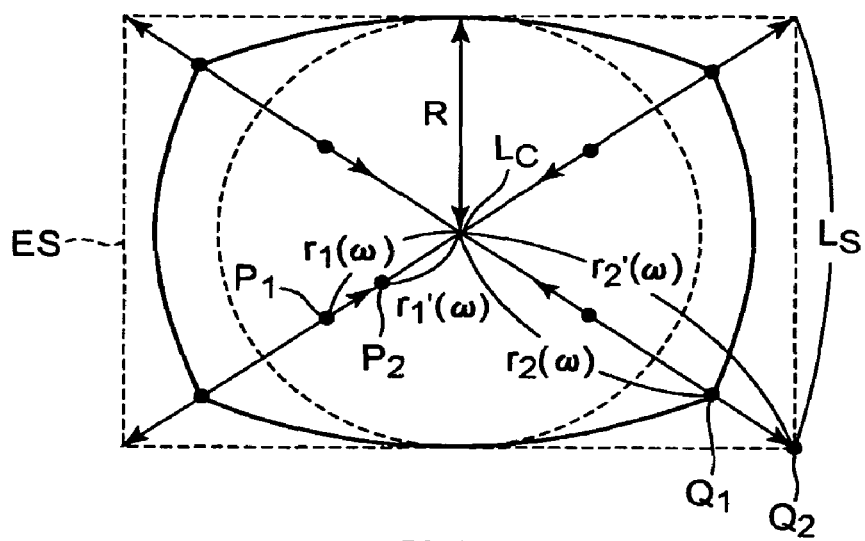
FIG. 7 is a diagram showing a basic concept in a case where a distortion of an image is electrically corrected.
Figure 8:
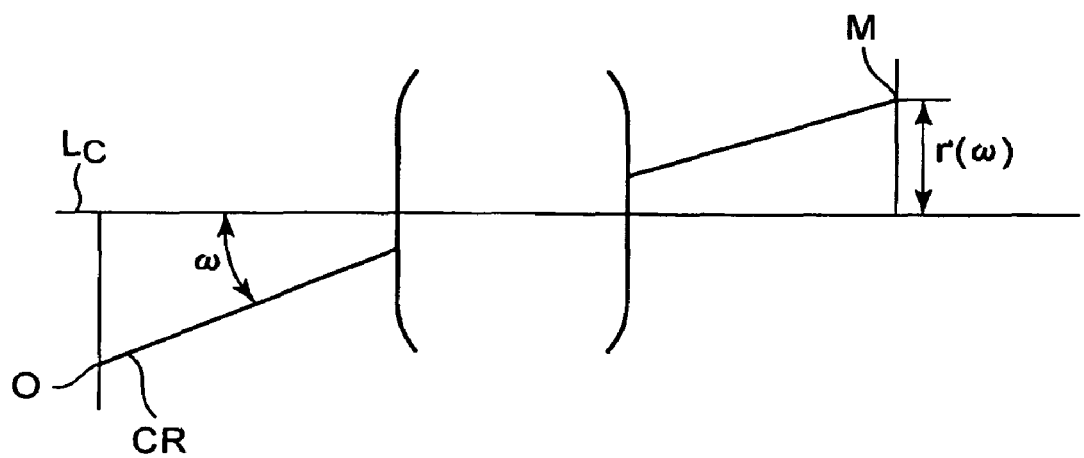
FIG. 8 is a diagram showing meaning of a half angle of an object view.

As shown in FIG. 7, a circle which comes in contact with long sides of an effective image pickup surface ES having the center on an intersection between an optical axis Lc and the image pickup surface and which has a radius R (an image height R) is considered. Magnifications at points on the circumference of this circle are fixed, and circumferential points are regarded as references for the correction. Moreover, other circumferential points on an arbitrary radius r(ω) (the image height r(ω)) are moved in a substantially radial direction, and are concentrically moved so as to provide a radius r'(ω). In consequence, the distortion of the optical image is corrected. For example, in FIG. 7, a point $P_1$ positioned inwardly from the circle having the radius R on a circumference of an arbitrary radius $r_1$(ω) is moved to a point $P_2$ on a circumference of the radius r'(ω) inwardly toward the center of the circle. A point $Q_1$ positioned on a circumference of an arbitrary radius $r_2$(ω) outside the circle having the radius R is moved to a point $Q_2$ on a circumference of a radius $r_2$'(ω) away from the center of the circle. Here, the radius r'(ω) can be represented as follows:

$$r'(\omega) = \alpha \cdot f \cdot \tan \omega \quad (0 \leq \alpha \leq 1),$$

in which ω is a half angle of an object view, and f is a focal length of an image forming optical system (the zoom lens system in this example). Here, as shown in FIG. 8, the half angle of the object view is an angle between the optical axis Lc and a chief ray CR from an object point O corresponding to an image point M formed at a position of a height r'(ω) from the center of the image pickup surface.

Here, assuming that an ideal image height corresponding to a point on the circumference of the radius R (the image height R) is Y, the following equation results:

$$\alpha = R/Y = R/(f \cdot \tan \omega).$$

Ideally, the optical system is rotationally symmetric with respect to the optical axis. Therefore, the distortion is also rotationally symmetrically generated with respect to the optical axis. In a case where the optically generated distortion is electrically corrected, if the distortion can be corrected using symmetry with respect to the optical axis as described above, the correction is advantageous in respect of a data amount and a calculation amount.

However, when the optical image is photographed with an electronic image pickup device, the image is not represented by a continuous amount due to sampling by pixels of the image pickup device. Therefore, the circle of the radius R virtually drawn on the optical image is not a strictly correct circle, if the pixels are not radially arranged on the image pickup surface of the electronic image pickup device. That is, to correct a shape of an image given as an aggregate of data obtained from discrete coordinate points (the pixels of the electronic image pickup device), the circle having the magnification fixed as described above does not actually exist. Therefore, it is preferable to use a method of determining a moved coordinate ($X_i'$, $Y_j'$) for each pixel (coordinate ($X_i$, $Y_j$)). It is to be noted that when a plurality of pixels move to a position of one coordinate ($X_i'$, $Y_j'$), an average value of values of the pixels is obtained as data of the pixels at positions of the coordinate ($X_i'$, $Y_j'$). Moreover, data of a position where any point does not come is prepared by interpolation using data of several surrounding pixels having data generated by the movements of the pixels.

Especially, in an electronic image pickup apparatus of the zoom lens system, such a method is effective for the correction in a case where the point of the optical image in which the magnification should be fixed does not exist on the circumference having the center on the optical axis, and the circle of the radius R drawn on the optical image is asymmetric due to manufacturing errors and the like of the optical system and the electronic image pickup device.

In the electronic image pickup apparatus in which such correction is performed, to calculate a correction amount r'(ω)−r(ω), data indicating a relation between the half angle ω of the object view and the image height r, or data indicating a relation between the actual image height r and an ideal image height r' and α may be recorded in a recording medium incorporated in the electronic image pickup apparatus.

It is to be noted that the radius R may satisfy the following condition so that a light quantity does not excessively fall short at opposite ends of the image in a short-side direction, after the distortion of the image has been corrected.

$0 \leq R \leq 0.6 L_S$, in which $L_s$ is a length of the short side of the effective image pickup surface.

The radius R preferably satisfies the following condition.

$0.3 L_S \leq R \leq 0.6 L_S$.

Furthermore, it is most advantageous that the radius R is substantially equal to the radius of the circle which comes in contact with the long sides of the effective image pickup surface.

It is to be noted that in a case where the magnification is fixed in the vicinity of the radius R=0, that is, in the vicinity of the optical axis to perform the correction, a region extended in a radial direction increases. Therefore, the constitution is slightly disadvantageous in respect of the number of the pixels, but it is possible to secure an effect that the zoom lens system can be miniaturized even when the field of view is enlarged.

It is to be noted that the correction of the distortion of one image has been described above, but the focal length of the zoom lens system changes, and a state of the distortion included in the image changes with the change of the focal length. Therefore, it is preferable that a focal length zone which requires the correction between a maximum value (the telephoto end) and a minimum value (the wide-angle end) of the focal length is divided into several focal length zones to correct the distortion. For example, a correction amount is set so as to obtain a correction result which substantially satisfies r'(ω)=α·f·tan ω in each divided focal length zone in the vicinity of the telephoto end (a state in which the focal length is maximized in each zone), and the distortion of the image can be corrected in the corresponding zone by use of this correction amount. However, in this case, a certain degree of barrel type distortion remains in the resultant image in each divided focal length zone in the wide-angle end (a state in which the focal length is minimized in each zone). To avoid this, if the number of the focal length zones is increased, an amount of the data to be recorded for the correction in the recording medium increases. To solve the problem, one or several coefficients with respect to one or several focal lengths different from those in the divided focal length zones in the telephoto end and the wide-angle end are calculated beforehand. This coefficient may be determined based on a simulation or a measurement result of a case where the image pickup apparatus is actually used. Moreover, the correction amount is calculated so as to obtain the correction result which substantially satisfies the following condition in the vicinity of the telephoto end of each divided focal length zone:

$r'(\omega) = \alpha \cdot f \cdot \tan \omega$.

This correction amount may be multiplied by the coefficient for each focal length to determine the correction amount in the state of the focal length.

In addition, in a case where any distortion is not seen in an image obtained when focused at infinity, the following is established:

$f = y/\tan \omega$, in which y is a height (an image height) of the image point from the optical axis, f is a focal length of the image forming system (the zoom lens system in this example), and ω is a half angle of an object view.

In a case where the image forming system has the barrel type distortion, the following results:

$f > y/\tan \omega$.

That is, assuming that the focal length f and the image height y of the image forming system are constant, a value of ω increases.

Next, as an embodiment of an electronic image pickup apparatus according to the present invention, an example of a digital camera will be described.

Figure 9:
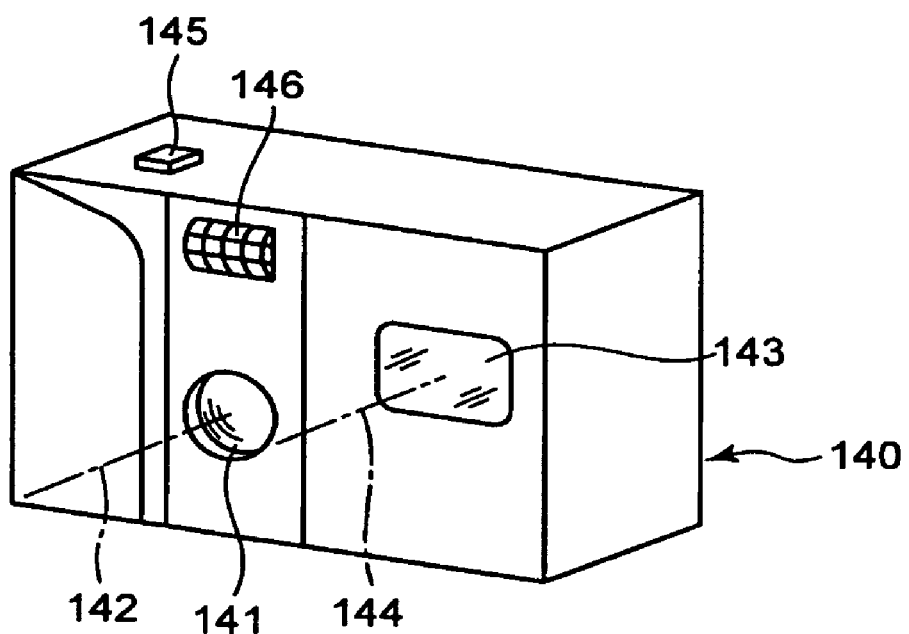
FIG. 9 is a front perspective view showing an appearance of an example of a digital camera according to the present invention.
Figure 10:
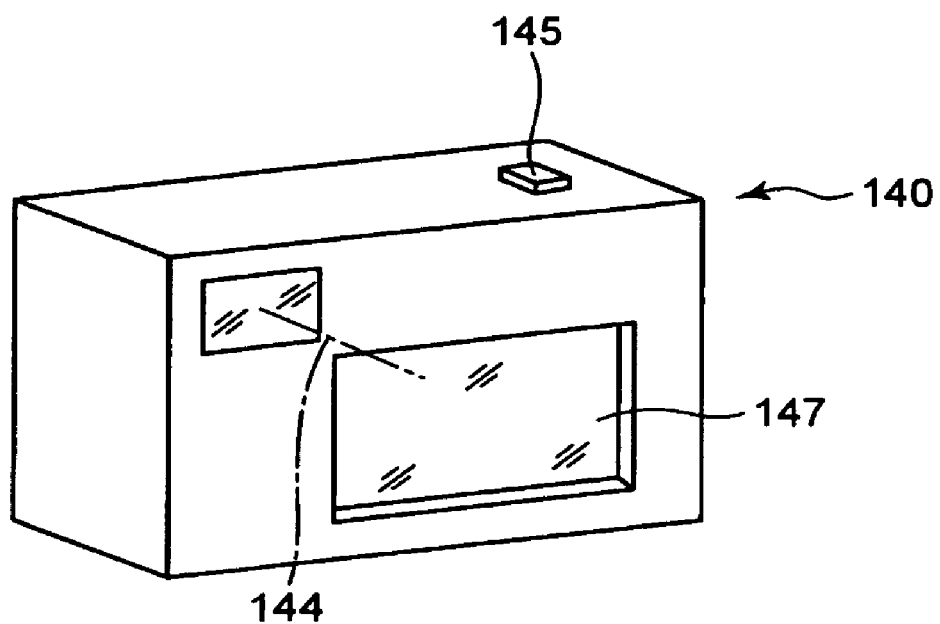
FIG. 10 is a back perspective view of the digital camera of FIG. 9.

FIGS. 9 to 11 are conceptual diagrams showing a constitution of a digital camera. FIG. 9 is a front perspective view showing an appearance of a digital camera 140, FIG. 10 is a back perspective view of the digital camera, and FIG. 11 is a schematic sectional view showing an internal constitution of the digital camera.

The digital camera 140 includes a photographing optical system 141 having an optical path 142 for photographing, a finder optical system 143 having an optical path 144 for a finder, a shutter release button 145, a flash lamp 146, a liquid crystal display monitor 147 and the like. When the shutter release button 145 disposed at an upper portion of the camera 140 is pressed, the photographing is performed through the photographing optical system 141 in response to the pressed button. An object image is formed by the photographing optical system 141 on an image pickup surface of a CCD image sensor 149 via a near infrared cutting filter and an optical low pass filter F. The object image received by the CCD image sensor 149 is displayed as an electronic image in the liquid crystal display monitor 147 provided at a back surface of the camera via processing means 151. This processing means 151 is connected to recording means 152, and the photographed electronic image can be recorded. It is to be noted that this recording means 152 may be integrated with the processing means 151, or the means may separately be arranged. As the recording means, a memory or a hard disk drive (HDD) incorporated in the digital camera may be used, or an HDD, a memory card, a DVD or the like detachably attached to the digital camera may be used.

Furthermore, an objective optical system 153 for the finder is disposed along the optical path 144 for the finder. The object image is formed by this objective optical system 153 for the finder on a view field frame 157 of a Porro prism 155 as an image erecting member. Behind this Porro prism 155, an eyepiece optical system 159 is disposed which guides an erected image into an observer's eyeball E. Cover members 150 are disposed on an incidence side of the photographing optical system 141 and the objective optical system 153 for the finder and an emission side of the eyepiece optical system 159.

It is to be noted that in an example of FIG. 11, parallel flat plates are arranged as the cover members 150, but lenses having powers may be used. Alternatively, the plates may be omitted.

As a photographing optical system, the zoom lens system shown in FIG. 1A is used in this example. As apparent from FIG. 11, since an optical path is bent by the prism P, a size of the zoom lens system in a thickness direction of the camera is remarkably small as compared with a length of the zoom lens system from an incidence surface to an image surface. Therefore, the digital camera can be thinned.

Figure 12:
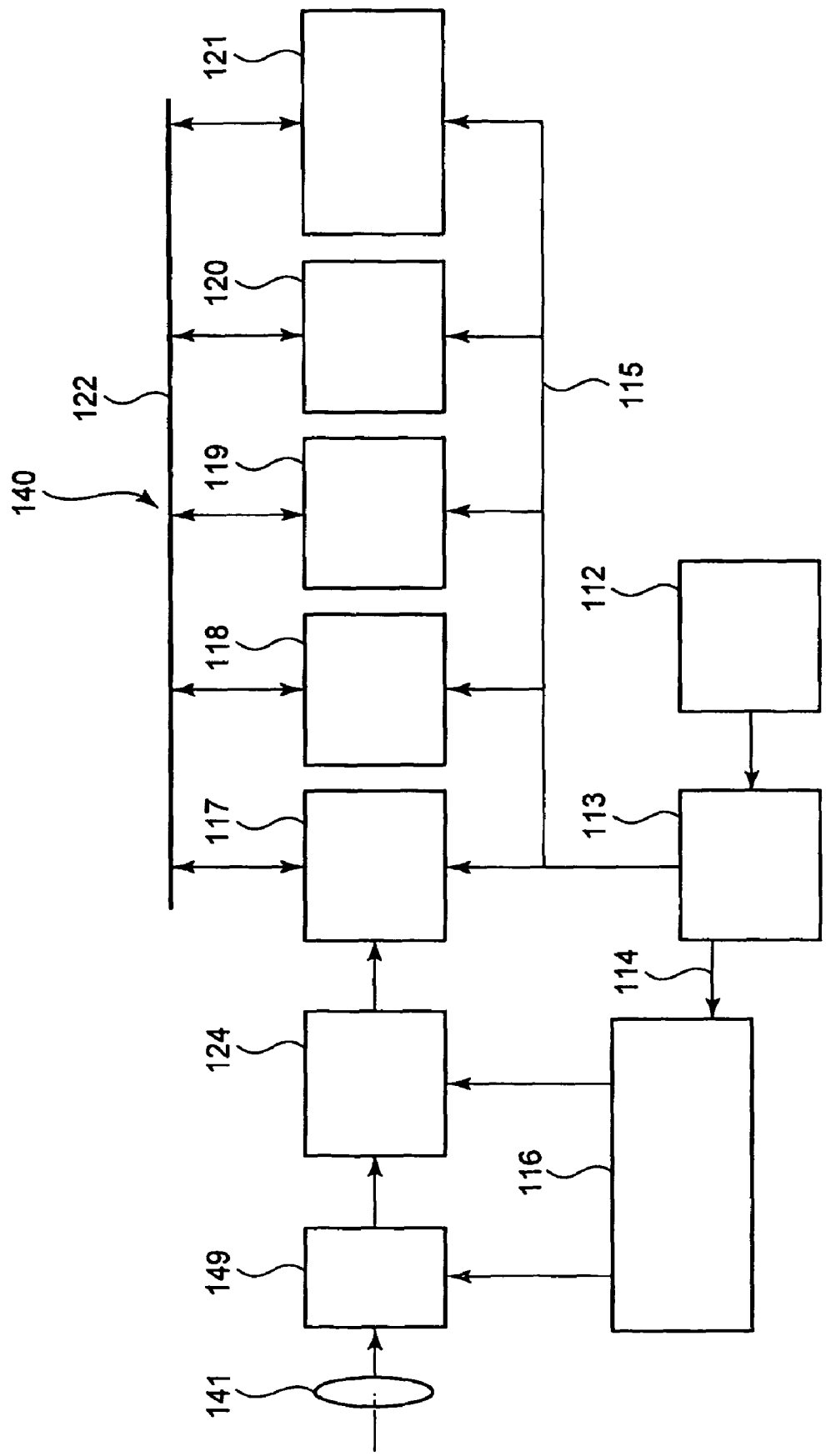
FIG. 12 is a block diagram showing a main part of an inner circuit of the digital camera shown in FIG. 9.

FIG. 12 is a block diagram of a main part of an internal circuit of the digital camera 140. It is to be noted that in the following description, the processing means 151 includes, for example, a CDS/ADC section 124, a temporary storage memory 117, an image processing section 118 and the like, and recording means 152 includes a storage medium section 119 and the like.

As shown in FIG. 12, the digital camera 140 includes an operating section 112, a control section 113 connected to this operating section 112, and an image pickup driving circuit 116, the temporary storage memory 117, the image processing section 118, the storage medium section 119, a display section 120 and a setting information storage memory section 121 which are connected to a control signal output port of the control section 113 via buses 114 and 115.

The temporary storage memory 117, the image processing section 118, the storage medium section 119, the display section 120 and the setting information storage memory section 121 are constituted so that they can input or output data with respect to one another via a bus 122. The image pickup driving circuit 116 is connected to the CCD image sensor 149 and the CDS/ADC section 124.

The operating section 112 includes various input buttons and switches such as the shutter release button, and transmits, to the control section, event information input from the outside (a camera user) via these input buttons and switches.

The control section 113 includes a central processing unit (CPU) and the like. The section is a circuit in which a program memory (not shown) is incorporated and which controls the whole digital camera 140 in response to an instruction command input from the camera user via the operating section 112 in accordance with a program stored in the program memory.

The CCD image sensor 149 receives the object image formed via the photographing optical system 141. The CCD image sensor 149 is an image pickup device which is driven and controlled by the image pickup driving circuit 116 and which converts, into an electric signal, a light quantity of the object image for each pixel to output the signal to the CDS/ADC section 124.

The CDS/ADC section 124 is a circuit which amplifies the electric signal output from the CCD image sensor 149 and which subjects the signal to analog/digital conversion to output, to the temporary storage memory 117, video bare data (hereinafter referred to as the raw data) simply subjected to the amplification and digital conversion.

The temporary storage memory 117 is a buffer including, for example, an SDRAM and the like, and is a memory device in which the raw data output from the CDS/ADC section 124 is temporarily stored. The image processing section 118 is a circuit which reads the raw data stored in the temporary storage memory 117 or the storage medium section 119 to subject the data to various electric image processing including distortion correction based on an image quality parameter designated by the control section 113.

The storage medium section 119 is a control circuit of, for example, an apparatus to which a card or stick type recording medium including a flash memory and the like is detachably attached and in which the raw data transferred from the temporary storage memory 117 and image data subjected to image processing by the image processing section 118 are recorded and retained in the card or stick type flash memory.

The display section 120 includes a liquid crystal display monitor 147 and a circuit to display an image, an operation menu and the like in the liquid crystal display monitor 147.

The setting information storage memory section 121 includes an ROM section in which various image quality parameters are stored beforehand, an RAM section to store the image quality parameter selected from the image quality parameters read from the ROM section by an input operation of the operating section 112, and a circuit which controls input/output with respect to these memories.

In the above-mentioned embodiments, a startup time (a time to extend lenses) to bring the camera into a use state as seen in a collapsible lens barrel is not required, and photographing can quickly be performed. Since the lenses do not extend or retract with respect to the camera, the constitution is preferable from a viewpoint of water-proof or dust-proof design.

The digital camera has been described above as an embodiment of the present invention, but the present invention is applicable to an electronic image pickup apparatus such as a video camera which forms an object image with a zoom lens system and receives the image with an electronic image pickup device such as a CCD image sensor to perform photographing.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An electronic image pickup apparatus comprising:
   a zoom lens system; and
   an image pickup device which is disposed on an image side of the zoom lens system and which converts an image formed by the zoom lens system into an electric signal,
   wherein the zoom lens system comprises, in order from an object side,
   a first lens unit having a negative refractive power,
   a second lens unit having a positive refractive power,
   a third lens unit having a negative refractive power, and
   a fourth lens unit having a positive refractive power,
   the first lens unit comprising, in order from the object side,
      a negative lens and a reflective optical element which reflects an optical path,
   during zooming from a wide-angle end to a telephoto end,
   each space between the lens units which are adjacent with each other being changed,
   the first lens unit being arranged in a fixed position to the image pickup device, and
   at least the second lens unit and the third lens unit being moved,
   wherein the reflective optical element is a prism having a reflective surface, and
   wherein said second lens unit includes a bi-convex lens element and a cemented lens component disposed on the image side of the bi-convex lens element, the cemented lens component including a positive lens element and a negative lens element, and wherein the third lens unit comprises a single lens component having a negative refractive power.

2. The electronic image pickup apparatus according to claim 1, wherein the bi-convex lens element is a most object side lens element in the second lens unit.

3. The electronic image pickup apparatus according to claim 2, wherein the second lens unit further comprises a second bi-convex lens element.

4. The electronic image pickup apparatus according to claim 1, wherein the zoom lens system comprises an aperture stop which moves integrally with the second lens unit.

5. The electronic image pickup apparatus according to claim 1, wherein the fourth lens unit including a single lens having a positive refractive power, the total number of the lenses of the fourth lens unit being one.

6. The electronic image pickup apparatus according to claim 1, wherein the zoom lens system being constituted as a four-unit zoom lens system, the second lens unit including, in order from the object side, a plurality of positive lenses and the negative lens, the negative lens being cemented to the positive lens disposed on the object side of the negative lens.

7. The electronic image pickup apparatus according to claim 1, wherein the following condition is satisfied:

$$0.4 < f2/ft < 0.8 \quad (1),$$

in which f2 is a focal length of the second lens unit, and ft is a focal length of the zoom lens system in the telephoto end.

8. The electronic image pickup apparatus according to claim 1, wherein the following condition is satisfied:

$$1.5 < |f1/fw| < 3.0 \quad (2),$$

in which f1 is a focal length of the first lens unit, and fw is a focal length of the zoom lens system in the wide-angle end.

9. The electronic image pickup apparatus according to claim 1, wherein the following condition is satisfied:

$$1.0 < |fL1/fw| < 2.0 \quad (3),$$

in which fL1 is a focal length fo the negative lens of the first lens unit closes to the object side, and fw is a focal length of the zoom lens system in the wide-angle end.

10. The electronic image pickup apparatus according to claim 1, wherein during the zooming from the wide-angle end to the telephoto end, the third lens unit moves toward the object side, and then the moves toward an image surface.

11. The electronic image pickup apparatus according to claim 10, wherein the third lens unit is arranged closer to the object side in the telephoto end than in the wide-angle end.

12. The electronic image pickup apparatus according to claim 1, wherein during the zooming from the wide-angle end to the telephoto end, the second lens unit moves toward the only object side, and has a state in which the second lens unit has a magnification of −1 while the second lens unit is moving, the third lens unit moves toward the object side, and then moves toward an image surface, and the fourth lens unit is arranged in a fixed position to the image pickup device.

13. The electronic image pickup apparatus according to claim 1, wherein the total number of the lenses of the third lens unit is one.

14. The electronic image pickup apparatus according to claim 1, wherein the third lens unit comprises a negative lens component which satisfies the following condition and whose concave surface faces the image side:

$$1.0 < (R1+R2)/(R1-R2) < 3.0 \quad (4),$$

in which R1 is a paraxial radius of curvature of an object-side surface of the negative lens component, and R2 is a paraxial radius of curvature of an image-side surface of the negative lens component, the lens component being a lens having only two surfaces of the object-side surface and the image-side surface which come in contact with air in the optical path, and being a single lens or a cemented lens.

15. The electronic image pickup apparatus according to claim 14, wherein a lens component of the third lens unit is the only negative lens component, the image-side surface of the second lens unit is a concave surface, and the object-side surface of the fourth lens unit is a convex surface.

16. The electronic image pickup apparatus according to claim 1, wherein the first lens unit includes one positive lens and one negative lens on an image-surface side of the reflective optical element.

17. The electronic image pickup apparatus according to claim 1, wherein the fourth lens unit comprises one positive lens component having an aspherical surface, the total number of lens components of the fourth lens unit is one, and the lens component is a lens having only two surfaces of an object-side surface and an image-side surface which come in contact with air in the optical path, and is a single lens or a cemented lens.

18. The electronic image pickup apparatus according to claim 1, further comprising:

a processing section which performs signal processing to electrically correct a distortion of the zoom lens system based on a signal from the image pickup device.

* * * * *